(12) United States Patent
De Ponnat et al.

(10) Patent No.: US 10,047,612 B2
(45) Date of Patent: Aug. 14, 2018

(54) METHOD AND DEVICE FOR MANUFACTURING TURBINE BLADES

(71) Applicant: Mecachrome France, Amboise (FR)

(72) Inventors: Arnaud De Ponnat, F-Parcay-Meslay (FR); Olivier Martin, Saint Genevieve des Bois (FR)

(73) Assignee: Mechachrome France, Amboise (FR)

( * ) Notice: Subject to any disclaimer, the term of this patent is extended or adjusted under 35 U.S.C. 154(b) by 454 days.

(21) Appl. No.: 14/441,869

(22) PCT Filed: Nov. 8, 2013

(86) PCT No.: PCT/FR2013/052695
§ 371 (c)(1),
(2) Date: May 11, 2015

(87) PCT Pub. No.: WO2014/072661
PCT Pub. Date: May 15, 2014

(65) Prior Publication Data
US 2015/0292339 A1  Oct. 15, 2015

(30) Foreign Application Priority Data

Nov. 9, 2012 (FR) .................. 12 60682
Jan. 15, 2013 (FR) .................. 13 00071

(51) Int. Cl.
*F01D 5/28* (2006.01)
*F01D 5/14* (2006.01)
*B23P 15/02* (2006.01)

(52) U.S. Cl.
CPC ............... *F01D 5/28* (2013.01); *B23P 15/02* (2013.01); *F01D 5/147* (2013.01);
(Continued)

(58) Field of Classification Search
CPC ......... Y10T 29/49332; Y10T 29/49336; Y10T 29/37; Y10T 29/49794; Y10T 29/49995;
(Continued)

(56) References Cited

U.S. PATENT DOCUMENTS 1,377,300 A    5/1921  Withington
5,711,068 A    1/1998  Salt
(Continued)

FOREIGN PATENT DOCUMENTS

DE         450960 C      10/1927
DE    102007051499 A1     4/2009
(Continued)

OTHER PUBLICATIONS

Translation of DE450960, generated Oct. 18, 2017.*
(Continued)

*Primary Examiner* — Matthew P Travers
(74) *Attorney, Agent, or Firm* — Banner & Witcoff, Ltd.

(57) ABSTRACT

A method and device for manufacturing turbine blades (5; 7; 28; 33) made of a metal alloy. Starting with aluminum and titanium alloy bar (10; 34) having a simple and/or axisymmetric shape, at least two mutually interlocking blanks (2; 3; 4; 8; 11) are produced in the bar (10; 34) by waterjet cutting (16) and then each one of the blanks (2; 3; 4; 8; 11) thus obtained is machined separately in order to obtain the blades (5; 7; 28; 33) having a final profile.

6 Claims, 4 Drawing Sheets

(52) U.S. Cl.
CPC ...... *F05D 2230/10* (2013.01); *F05D 2230/53* (2013.01); *Y10T 29/49336* (2015.01); *Y10T 29/49794* (2015.01)

(58) Field of Classification Search
CPC ............... Y10T 29/49996; B23P 15/02; F05D 2230/24; F05D 2300/174; F05D 2230/53; F05D 2230/10–2230/18
See application file for complete search history.

(56) References Cited

U.S. PATENT DOCUMENTS

| | | | | |
|---|---|---|---|---|
| 6,739,049 | B2* | 5/2004 | Nicholson | B21D 26/055 29/889.7 |
| 7,578,059 | B2* | 8/2009 | Bergue | B21D 53/78 29/889 |
| 2010/0015005 | A1* | 1/2010 | Oehring | C22C 14/00 420/580 |
| 2010/0226781 | A1* | 9/2010 | Wallis | B21D 26/055 416/232 |
| 2012/0048430 | A1* | 3/2012 | Das | B21J 1/00 148/557 |

FOREIGN PATENT DOCUMENTS

| | | |
|---|---|---|
| DE | 102010042585 A1 | 4/2012 |
| EP | 1623792 A1 | 2/2006 |
| EP | 2423340 A1 | 2/2012 |
| JP | S5391412 A | 8/1978 |
| JP | S59102533 A | 6/1984 |
| JP | 2000068026 A | 3/2000 |
| RU | 2381083 C1 | 2/2010 |

OTHER PUBLICATIONS

Definition of "imbricate", Merriam-Webster, accessed Mar. 15, 2018, https://www.merriam-webster.com/dictionary/imbricated.*
International Search Report of PCT/FR2013/052695, dated Feb. 11, 2014.

* cited by examiner

METHOD AND DEVICE FOR MANUFACTURING TURBINE BLADES

The present invention relates to a method for manufacturing turbine blades in metal alloy.

It also relates to a manufacturing device implementing such a method, and to the blades thus obtained.

It finds a particularly important although not exclusive application in the field of blades or vanes used in the aeronautical sector or the field of energy.

Traditionally, aeronautic blades have come from castings or forgings which have been partially or completely re-machined.

When the machining is only partial and particularly when the profile of the blade is finished without mechanical re-machining, a straightening, shaping and/or sizing operation is then essential in order to ensure functional sizing.

For small-sized turbine blades, when making development prototypes, or for optimization, or even for production blades made of inexpensive and easily machined materials, use is made of ranges which are said to be machined from solid.

Such solutions have disadvantages where it is desirable to use titanium aluminide (gamma TiAl) which has good temperature resistance but is extremely fragile at ambient temperature.

More specifically, these known solutions present the following problems.

In the context of a range obtained from a forged bar, the forging has to be carried out under near-isothermal conditions and with relatively low strain rates and at high temperature. In such cases, the tooling is expensive and has a limited life.

High throughput rates are also difficult to achieve (requiring a multiplicity of special-purpose and expensive facilities) and sizing in addition needs to be performed at high temperature. As a result it is difficult to create a blade with a finished profile from this type of material, even if any additional thickness is taken off by chemical machining.

In conclusion, starting from an over-thickness forging or extrusion and performing a subsequent mechanical machining operation over the entire surface is possible but requires a complex range of machining operations in order to be capable of coping with the deformations associated with the relaxation of stresses, or even use of a self-adapting range of operations. Furthermore, using a forging means that there need to be at least three families of operations: producing the material, forging and machining, with a relatively lengthy manufacturing cycle.

Methods for manufacturing turbomachine blades made by taking a blank from a ring with tubular wall are known (EP 1 623 792).

The blades thus forged has disadvantages. Their geometry is very constrained being contained in a tube section. Because notably of the curvature of the tube, it requires a twisting/bending operation and the method does not allow a finished product to be obtained by machining. In addition, they are limited in terms of their size, notably thickness.

In the case of a range obtained from casting, the casting has to be performed under vacuum or under a protective atmosphere and using methods that allow relatively thin sections to be fed with metal very quickly (methods involving spinning for example).

Obtaining a profile that is acceptable without the need for subsequent mechanical machining therefore entails a straightening operation, which can be likened to the previous sizing operation in instances where titanium aluminide (gamma TiAl) is used, the purpose of this being to limit the level of non-conforming parts, with the same disadvantages as those indicated hereinabove.

In fact, to start from an over-thickness forging and subsequently mechanically machine the entire surface is admittedly possible but once again entails a complex range of machining operations in order to be capable of coping with the deformations associated with the relaxation of stresses, said method nevertheless generating a high level of scrap associated with casting defects that come into the open after machining.

An operation of hot isostatic pressing is therefore also often needed in order to close up the casting defects and thus limit their presence in the casting.

Using a casting finally necessitates the use of three to five families of operations: producing material, casting it, possible hot isostatic pressing, possible straightening, and finally machining, and once again is accompanied by a relatively lengthy manufacturing cycle.

Methods of manufacturing turbine elements from a casting with heat treating and machining are also known (EP 2 423 340).

These methods further add a complex and expensive heat treatment stage. In addition, they work by cutting rectangular slices of juxtaposed materials, which means that no economizing of material can be achieved.

In the case of a range said to be machined from solid using mechanical machining, this in this instance means taking a billet (produced by casting or by extrusion) and converting this simple geometry into that of the component by removing the surplus material using machining.

Bearing in mind the difficulty there is in machining gamma TiAl (once again, fairly low cutting rates, significant tool wear, the fragility of the material at ambient temperature, etc.) and the significant cost of the material, this route here presents even more serious disadvantages in the mass-production of blades.

The present invention seeks to alleviate these disadvantages and to propose a method and a device better suited than those previously known to the requirements of practical experience, notably by limiting the amount of material used and therefore the amount of material that has to be machined by comparison with the range referred to as machined from solid, and to dispense with a balancing operation, reduce manufacturing cycles and cost of energy and do all of this using standard industrial facilities.

Balancing here means repositioning a component or orienting it in space in order to measure its flatness defects and/or deformation with respect to a reference in order to minimize/average out the geometric defects of the component.

With the invention it is going to be possible to conceive of unfinished products that allow defects associated with casting to be excluded or minimized.

The consequence of this is a lower level of scrap.

In order to do so, the invention starts from the idea of selecting simple and/or axisymetric geometries in order therefrom make the initial solid bar, which makes it possible to use the stage of production of the material (the mixing of the various elements in order to make them into an alloy) in order to form said bar. This means that right from the outset it is possible to get around the operation of casting close to the desired dimensions.

What is meant by a bar with simple geometry is a solid bar with a polygonal, circular or oval or substantially polygonal, substantially circular or substantially oval generatrix section.

The bar may therefore for example have a parallelepipedal shape of rectangular, square or trapezoidal cross section.

The cross section may be constant or non-constant according for example to the shape of the components ultimately desired, for example having ends that are more voluminous than the central part.

What is meant by an axisymetric bar is a solid bar elongate about an axis and having, for example, a cylindrical, conical or frustoconical geometric shape.

Once again, the cross section may be constant or may vary according to the position of the cross section along the axis.

Advantageously, the bar has one or more planar and/or convex faces.

According to one advantageous embodiment of the invention, the bar has faces that are planar or always convex.

This same simple geometry makes it possible to limit the presence of material defects and position these in precise and repeatable areas which will be cut off (eliminated).

The simple and/or axisymetric geometry additionally means that there will not be an excessively high level of residual stress because the cooling is more uniform as compared with a component that has massive and slender regions.

There is therefore a lower risk of scrapping as a result of deformation during machining.

To this end, the invention notably proposes a method of manufacturing turbine blades in a metal alloy from an element made of titanium and aluminum alloy, characterized in that, with the alloy being titanium aluminide and the element being a solid bar, at least two blanks imbricated in one another are made simultaneously in said bar by water jet cutting, then each of said blanks thus obtained is machined separately to arrive at said blades with a definitive profile.

In other words, several blades, for example made of gamma TiAl, are imbricated in an optimized way in one and the same billet (or bar), something which entails going against received wisdom that favors ranges that are cast (with finished or semi-finished profile).

To do so, it was necessary to accept the need to optimize the imbrication each time, entailing careful advance consideration as to the positioning of the components relative to one another, additionally defining the optimum number thereof, while at the same time incorporating the constraints of the cutting method or methods to be used.

In some cases, that will entail going back and modifying the design of the component in order to optimize the imbricating thereof, for example by moving blade parts on the disk or adding a part, something which will go against the train of thought of a person skilled in the art.

The imbricated cutting allows several components to be made from the same bar thereby limiting the quantity of material.

It also makes it possible to recover good quality material in greater quantity for recycling. It will be noted here that only the risers can be recovered in the casting route, the gates being cut off.

The present invention makes it possible to avoid these disadvantages.

With the present invention, it is thus possible to start from a, for example, 2.3 kg bar of material, for two 0.4 kg blanks after water-jet cutting, in order to obtain two components (blades) weighing, for example, 90 grams.

The level of scrap observed is therefore less than 5%, whereas the usual level of scrap in mass production of the prior art for these components and in an alloy that is easier to work than that of the invention is of the order of 35%.

The cost breakdown for the component (for the same amount of scrap and equal material price per kilo, etc.) shows a saving of 10% compared with that which is usually observed.

In advantageous embodiments of the invention, recourse is additionally had to one and/or another of the following arrangements:

the imbricated blanks are identical, produced facing one another, so that they are symmetric in pairs, respectively, with respect to a point, a straight line or a central plane;

the titanium aluminide alloy is gamma TiAl;

the blanks are made from a cast bar;

the blanks are made from an extruded bar;

the blanks are made from a cylindrical bar;

the blanks are made from a bar having one or more external face(s) comprising only straight or convex surfaces.

The invention also proposes a device implementing the method described hereinabove.

It also proposes a device for manufacturing turbine blades in metal alloy, characterized in that it comprises a tool for the water-jet cutting of a metal bar, a programmable controller for controlling the cutting tool designed to produce at least two blanks imbricated in one another simultaneously from one and the same titanium and aluminum alloy bar, and means for machining each of said blanks thus obtained in order to arrive at said blades with a definitive profile.

Advantageously, the tool and programmable controller controlling the tool are designed to cut identical imbricated blanks facing one another, symmetric in pairs with respect to a point, a straight line or a central plane.

Advantageously also, the alloy is titanium aluminide (gamma TiAl).

The invention also proposes a turbine blade obtained with the method described hereinabove.

The invention will be better understood from reading the following description of some embodiments described hereinbelow by way of nonlimiting examples.

The description refers to the accompanying drawings in which.

Figure 1:
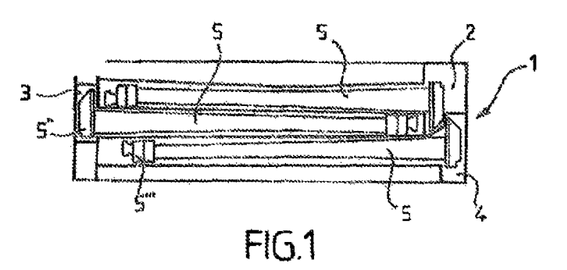
FIG. 1 illustrates a side view of a parallelepipedal bar or billet from which three imbricated blanks for the production of turbine blades are made according to a first embodiment of the invention.

FIG. 1 schematically shows a side view of a solid parallelepipedal bar or billet 1 made of titanium aluminide from which are made three blanks 2, 3, 4 which are imbricated (in one another), and identical or substantially identical (taking optimizing of the imbricating into consideration) in order to produce turbine blades 5 according to one embodiment of the invention.

The billet 1 is, for example, a 6 kg billet for producing three substantially 2 kg blanks from which three 1 kg blades will be extracted. The blades each have a core 5' and two ends 5" and 5''' which are configured in a way known per se by machining.

Figure 2:
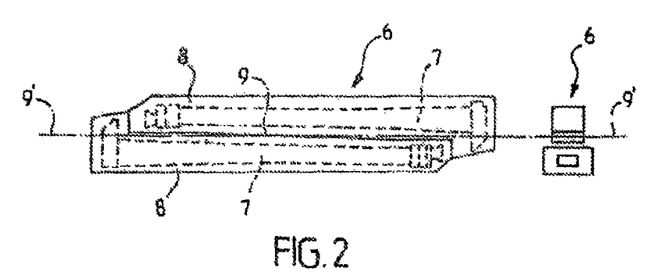
FIG. 2 is a side view and a transverse view of another embodiment of a cylindrical bar in which two imbricated blanks/blades are made according to the invention.

FIG. 2 is one embodiment of another bar 6 of simple geometry, elongate about an axis, in this instance cylindrical and capable of allowing the manufacture of two blades 7 from blanks 8 which are symmetric about a point of symmetry 9 belonging to the central plane 9'.

The blanks 2, 3 or 4 or 8 imbricated in one another are obtained by cutting from the same bar using a water jet as will be described hereinafter.

Figure 3:
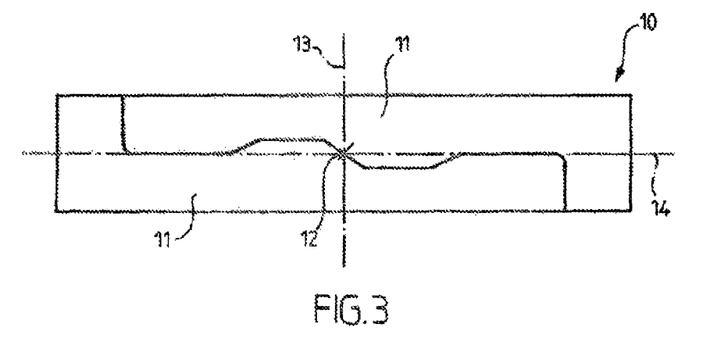
FIG. 3 is a view in cross section of two imbricated blade blanks according to another embodiment of the invention.

FIG. 3 shows a view in cross section of a parallelepipedal bar 10 from which two identical blanks 11 imbricated, in this instance symmetrically with respect to an axis 12 obtained by the intersection of two planes 13 and 14 of symmetry of the parallelepipedal bar 10 are cut by a cutting gun.

Figure 4:
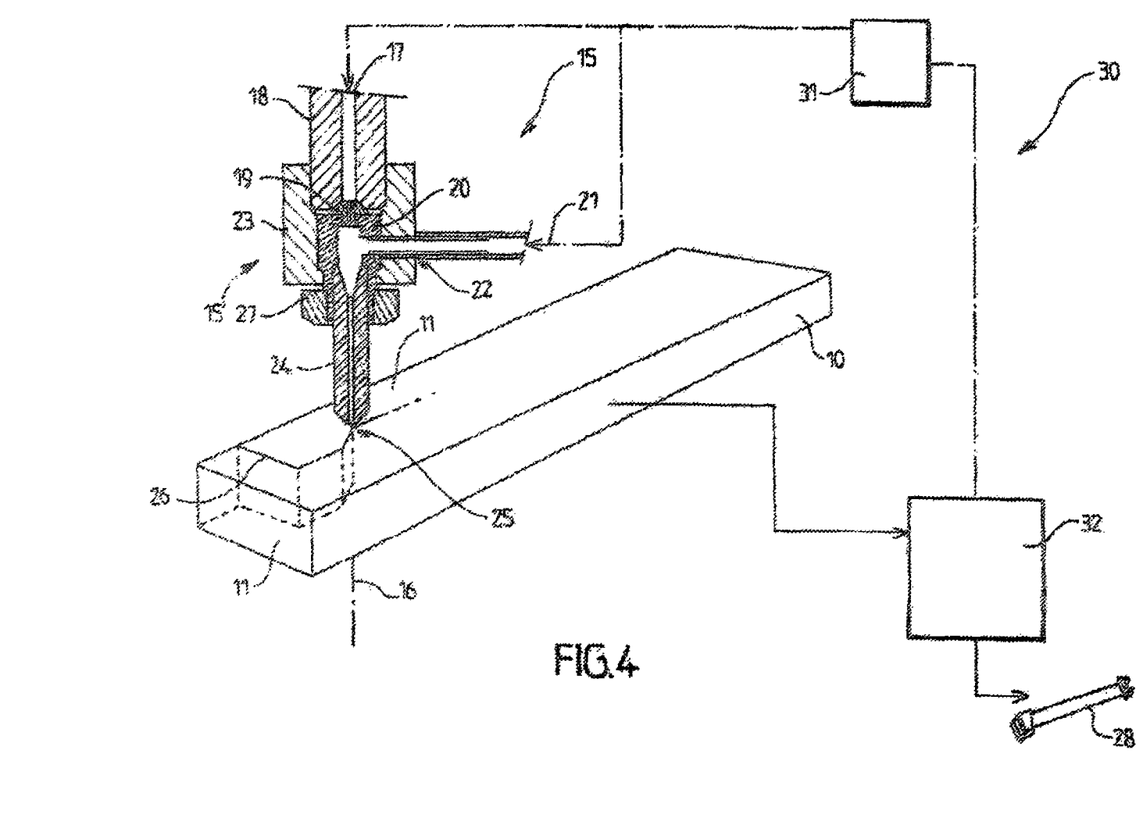
FIG. 4 is a schematic diagram of a device for manufacturing a turbine blade according to one embodiment of the invention.

FIG. 4 more specifically shows one embodiment of a device 15 implementing the method for cutting the blank 10.

This method uses a water jet 16 cutting gun 15' of the type known per se.

The water, at a very high pressure (for example 3800 bar) is introduced at 17 into a collimating tube 18 and is then focused via a nozzle 19 in a mixing chamber 20 where it is mixed with an abrasive 21 introduced at 22 into the chamber situated in the body of the head 23 of the gun 15'.

The focusing gun 15' comprises an injector 24 which will attack the bar 10 at 25 in order to make the cut 26 along the cutting path desired by the designer of the blades and which has notably been optimized in terms of material consumption.

A tightening nut 27 allows the injector of the focusing gun to be fixed to the head body 23.

Figure 5:
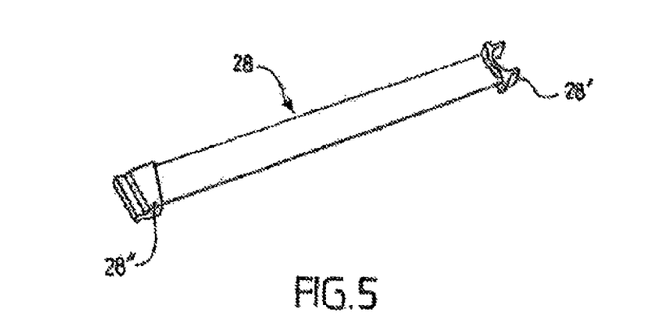
FIG. 5 is a perspective view of a blade obtained using the method according to the invention more particularly described here.

From the two blanks 11 obtained from the bar 10, and according to the embodiment of the method more particularly described here, each of said blanks 11 thus obtained is then machined separately to arrive at the blades 28 as depicted in FIG. 5.

Such a cutting method was not used in the prior art because the person skilled in the art did not envision the benefit of imbricating blanks in one another but was seeking rather from the outset, given the complexity of the components to be obtained, to manufacture these one by one from a single bar of more complex shape.

The intelligence therefore lay in the design of the casting mold.

The device 15 moreover comprises a programmable controller 30 for controlling the gun 15', comprising a computer 31 programmed to produce simultaneously the two blanks 11 imbricated in one another in a way known per se. Once the blanks 11 have thus been obtained, machining means 32 which work by removing chips, or other known means such as electrochemical machining means comprising, for example, four-axis milling centers, precision electrochemical machining (PECM) machines, grinding centers, etc. are provided in order to obtain the blades 28 as described hereinabove.

Figure 6:
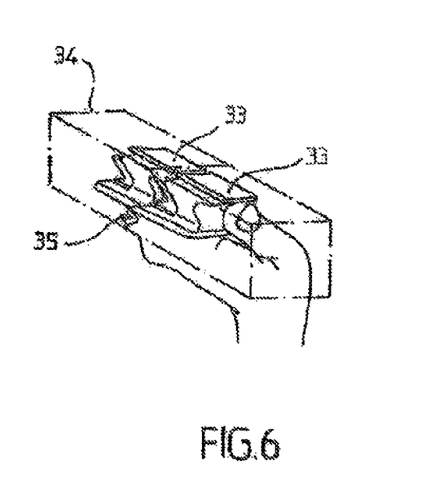
FIG. 6 is a perspective view of two imbricated vane blanks produced according to the method according to the invention.

FIG. 6 depicts another embodiment of identical blades 33 obtained from a parallelepipedal bar 34 in chain line in the figure, cut along the curve 35 to obtain the blanks and programmed accordingly.

Figure 7:
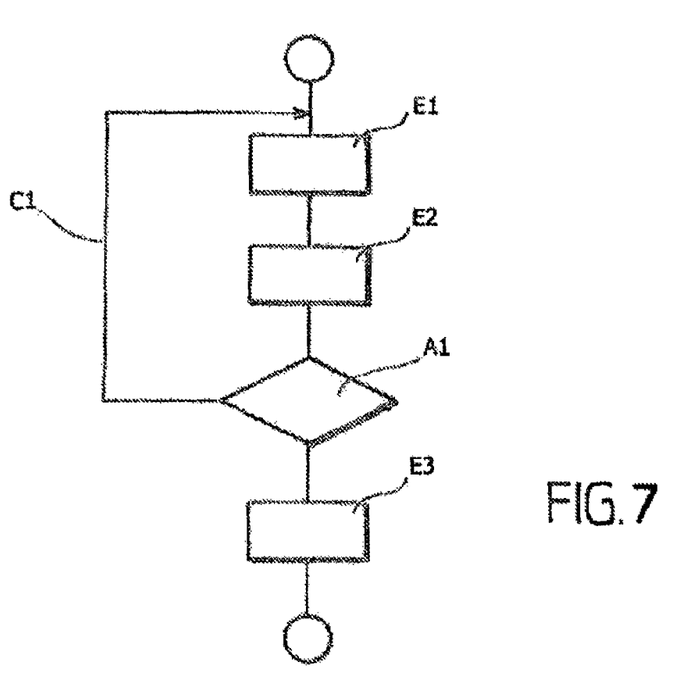
FIG. 7 schematically illustrates the steps of a method according to one embodiment of the invention.

One embodiment of the manufacture of a blade will now be described with reference to FIG. 7.

Having chosen a solid bar, the method comprises a first step E1 in which the geometric parameters of the bar are input into the computer 31.

The computer 31 creates a model of the bar on the basis of this information.

In a second step E2, blade geometry parameters are input into the computer 31 which likewise creates models of blades for a determined use, for example for a vane positioned in the flow path along which a turbomachine air flow passes under determined aerodynamic conditions.

The computer 31, which comprises programmed computation means, compares the bar and blade models in order therefrom to determine the optimum layout, i.e. the layout most economical in terms of material while at the same time complying with physical constraints.

For example, a model is formed by a list of quadruplets. Each of the first three data elements represents one of the three coordinates of a Cartesian space, and the final one corresponds to whether or not this belongs to the component/bar modeled.

The program contains an algorithm A1 which:

determines a frame of reference in space, positions the model of the bar in this frame of reference, positions a number (for example three) of points of the determined blade model, and determines whether or not, as a function of the points of the blade model that are positioned in said frame of reference, the entirety of the model is contained within the bar and whether any point is superposed with another blade already positioned. This step is performed for example by comparing each model quadruplet by quadruplet.

If a blade and the bar are compared and there is at least one blade quadruplet that has no equal in the bar model (scenario 1) then at least one point of the blade lies outside the bar, If two blades are compared and there is at least one quadruplet of each model that is the same as each other (scenario 2) then at least one point on each blade overlaps with each other.

repeats the preceding step as long as scenario 1 or scenario 2 arises.

If the algorithm finds no solution for combining the blades in a bar then the method returns via C1 to an earlier step E1 (or, in another embodiment, E2).

This looping-back makes it possible to ensure that the imbrication is optimized, which imbrication is not a simple juxtaposition and therefore allows savings to be made on material and, in certain instances, reveals the benefit of reengineering the blades.

The computer 31 may comprise display means (not depicted) that allow the various blades in the same bar to be viewed and possibly repositioned by an operator 31.

Other parameters may also be included in the algorithm in order to optimize the positioning of the blades, for example the characteristics of the cutting water jet (width, depth, etc.) and data relating to the quality of the material at a given point.

Finally, in a third step E3, the computer determines the cutting profile, for example a midline curve between the model of blades in the bar and steers the water jet accordingly in order to perform the cutting.

As goes without saying and as is incidentally evident from the foregoing, the invention is not restricted to the embodiments more particularly described but on the contrary encompasses all variants thereof and notably those in which more than three blanks are obtained by simultaneous cutting, in which the profile of a bar is not straight but curved, or those in which the perimeters of the generatrix cross sections comprise a small and limited number (less than 25) of points joined together by straight lines or curves.

The invention claimed is:

1. A method of manufacturing turbine blades (5; 7; 28; 33) in a metal alloy from a solid bar elongate about an axis and made of titanium aluminide comprising:
   making at least two blanks (2; 3; 4; 8; 11) imbricated in one another in said bar (10; 34) by water jet (16) cutting;
   separately machining each of said blanks (2; 3; 4; 8; 11) thus obtained to arrive at a blade (5; 7; 28; 33) with a definitive profile from each of said blanks.

2. The method as claimed in claim 1, characterized in that the imbricated blanks (2; 3; 4; 8; 11) are identical, produced facing one another, so that they are symmetric in pairs, respectively, with respect to a point (9), a straight line or a central plane (9').

3. The method as claimed in claim 1, characterized in that the titanium aluminide alloy is gamma TiAl.

4. The method as claimed in claim 1, characterized in that the blanks (2; 3; 4; 8; 11) are made from a cast bar (10; 34).

5. The method as claimed in claim 1, characterized in that the blanks (2; 3; 4; 8; 11) are made from an extruded bar (10; 34).

6. The method as claimed in claim 1, characterized in that the blanks (2; 3; 4; 8; 11) are made from a cylindrical bar (10; 34) and/or a bar having one or more external face(s) comprising only straight or convex surfaces.

* * * * *

UNITED STATES PATENT AND TRADEMARK OFFICE
CERTIFICATE OF CORRECTION

PATENT NO. : 10,047,612 B2
APPLICATION NO. : 14/441869
DATED : August 14, 2018
INVENTOR(S) : Arnaud De Ponnat et al.

Page 1 of 1

It is certified that error appears in the above-identified patent and that said Letters Patent is hereby corrected as shown below:

On the Title Page

Column 1, under Assignee, Item (73):
Please delete "Mechachrome France," and insert --Mecachrome France,--

Signed and Sealed this
Twenty-fifth Day of December, 2018

Andrei Iancu
*Director of the United States Patent and Trademark Office*